United States Patent
Meulemans

(10) Patent No.: US 9,096,284 B2
(45) Date of Patent: Aug. 4, 2015

(54) SNOWMOBILE TRACTION DEVICE

(76) Inventor: Robert E. Meulemans, Appleton, WI (US)

( * ) Notice: Subject to any disclaimer, the term of this patent is extended or adjusted under 35 U.S.C. 154(b) by 628 days.

(21) Appl. No.: 13/046,438

(22) Filed: Mar. 11, 2011

(65) Prior Publication Data

US 2012/0007421 A1    Jan. 12, 2012

Related U.S. Application Data

(60) Provisional application No. 61/339,904, filed on Mar. 11, 2010.

(51) Int. Cl.
*B62D 55/28*    (2006.01)

(52) U.S. Cl.
CPC .......... *B62D 55/286* (2013.01); *Y10T 29/49947* (2015.01)

(58) Field of Classification Search
CPC ...... B62D 55/27; B62D 55/28; B62D 55/286; B62M 2027/027
USPC ......... 305/160, 161, 162, 178, 179, 180, 187, 305/188, 191, 192
See application file for complete search history.

(56) References Cited

U.S. PATENT DOCUMENTS

| | | | | |
|---|---|---|---|---|
| 3,782,787 | A * | 1/1974 | Rubel et al. | 305/180 |
| 3,865,441 | A | 2/1975 | Jolliffe | |
| 3,973,808 | A * | 8/1976 | Janssen et al. | 305/180 |
| 4,194,583 | A | 3/1980 | Aaen | |
| 4,758,055 | A | 7/1988 | Anderson | |
| 5,547,268 | A | 8/1996 | Hansen | |
| 5,676,437 | A * | 10/1997 | Holmgren et al. | 305/180 |
| 5,685,621 | A * | 11/1997 | Nugent | 305/180 |
| 5,690,398 | A | 11/1997 | Pribyl | |
| 5,921,642 | A * | 7/1999 | Tschida | 305/180 |
| 6,609,772 | B2 * | 8/2003 | Musselman et al. | 305/180 |
| 7,188,505 | B2 | 3/2007 | Wankowski | |
| 2013/0049453 | A1 * | 2/2013 | Pattyn | 305/191 |

* cited by examiner

*Primary Examiner* — Jason S Morrow
*Assistant Examiner* — E Turner Hicks

(57) ABSTRACT

A traction enhancement device for a snowmobile including a plurality of traction studs extending from a stud plate. The device configured for mounting to a snowmobile track by a central mounting stud extending through the track and the stud plate. The device provides for a plurality of traction studs to be mounted to the track with only a single hole in the track. A method of mounting a fraction enhancement device to a snowmobile track that provides a plurality of traction studs with only a single hole through the track.

7 Claims, 7 Drawing Sheets

SNOWMOBILE TRACTION DEVICE

CROSS-REFERENCE TO RELATED APPLICATION

The present application claims priority to earlier-filed U.S. Provisional Application Ser. No. 61/339,904, filed on Mar. 11, 2011, the disclosure of which is incorporated herein by reference in its entirety.

BACKGROUND

It is known to provide studs or other types of elements to snowmobile tracks to enhance fraction and improve performance of the snowmobile to which the track is mounted. There are limitations to the ability to add such elements to snowmobile tracks due to restrictions on the number of holes that may be made through the track before the track is weakened below an undesirable level. When this maximum number of openings is reached, it is not possible to add additional traction enhancement elements within the constraints on modification of the tracks specified by the manufacturer. Conventional traction enhancement devices have utilized single studs extending through the track from an inside surface of the track and extending beyond the outer surface of the track.

Depending on the snow, ice or other surface conditions on which the snowmobile might be operated, it may be desirable to have more than the traction devices than the number of openings permitted in the track. Conventional track studs have provided lower features around a centrally mounted stud to enhance traction without increasing the number of opening but these have not provided all of the traction desired by users. Improvements to conventional traction enhancement devices for snowmobiles are desirable.

Additionally, it may be desirable to not form the maximum number of openings in the track so as to preserve as much of the strength of the track as possible. Thus having individual traction devices that provide greater traction than conventional devices may be desirable as well, allowing similar traction enhancements with fewer track opening.

BRIEF DESCRIPTION OF THE DRAWINGS

The accompanying drawing figures, which are incorporated in and constitute a part of the description, illustrate several aspects of the invention and together with the description, serve to explain the principles of the invention. A brief description of the figures is as follows.

DETAILED DESCRIPTION

The present disclosure relates generally to a device that may be added to the track of a snowmobile to enhance the traction of the snowmobile. More specifically, the present disclosure relates to a device that provides a plurality of studs extending from the track from a single opening made through the track.

Figure 1:
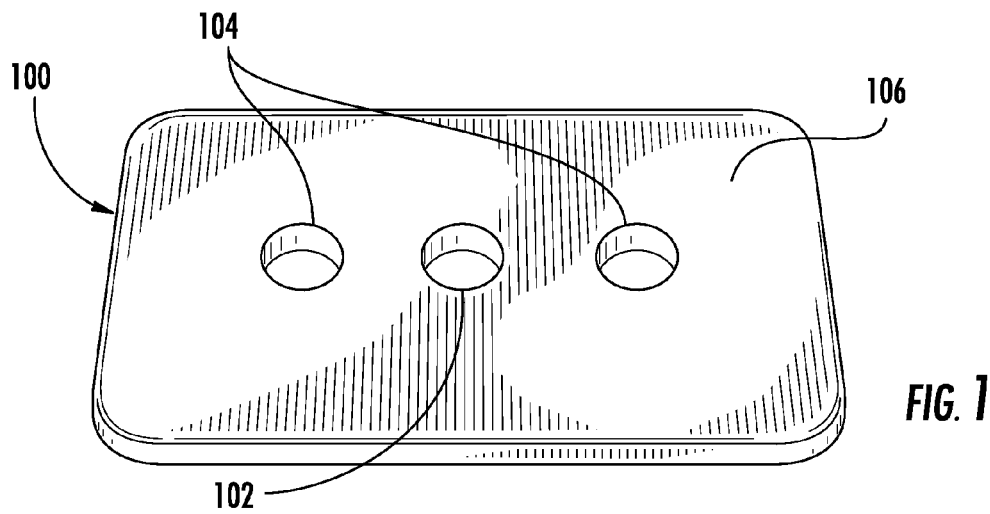
FIG. 1 is a top perspective view of a stud plate for a traction enhancement device according to the present disclosure for mounting to a snowmobile track.
Figure 2:
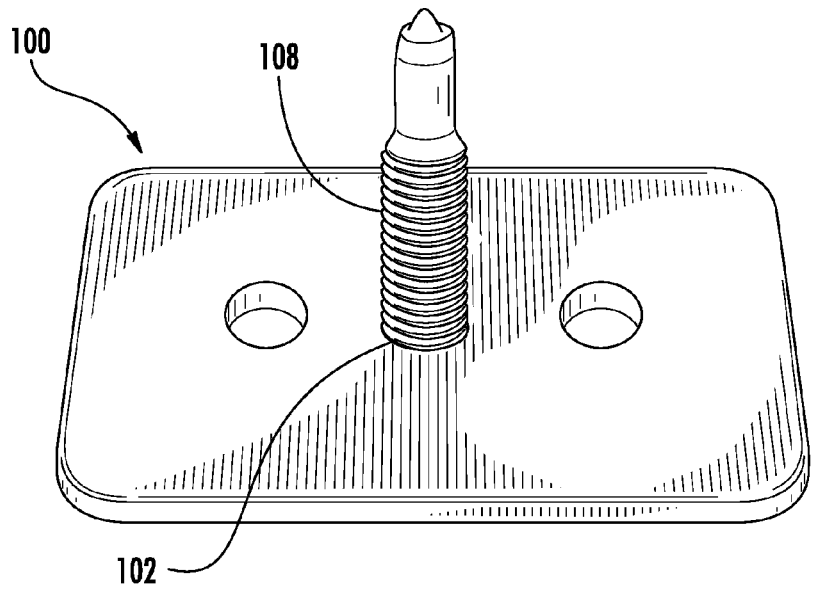
FIG. 2 is a top perspective view of the stud plate of FIG. 1 with a single stud positioned in a center opening.
Figure 3:
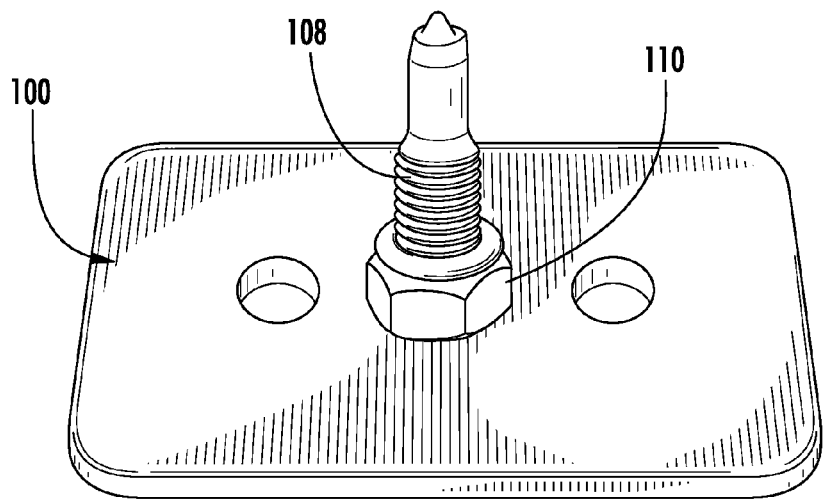
FIG. 3 is a top perspective view of the stud plate of FIG. 2 with a fastener positioned about the stud.

Referring now to FIG. 1, a stud plate 100 according to the present disclosure includes a base 106 with a mounting stud opening 102 and one or more side stud openings 104. In FIGS. 2 and 3, a mounting stud 108 has been positioned within opening 102 and a fastener such as a nut 110 is placed about stud 108 to secure the stud to the plate. It is anticipated that stud 108, being centrally located, would be the preferable stud for mounting stud plate 100 to a snowmobile track.

Figure 4:
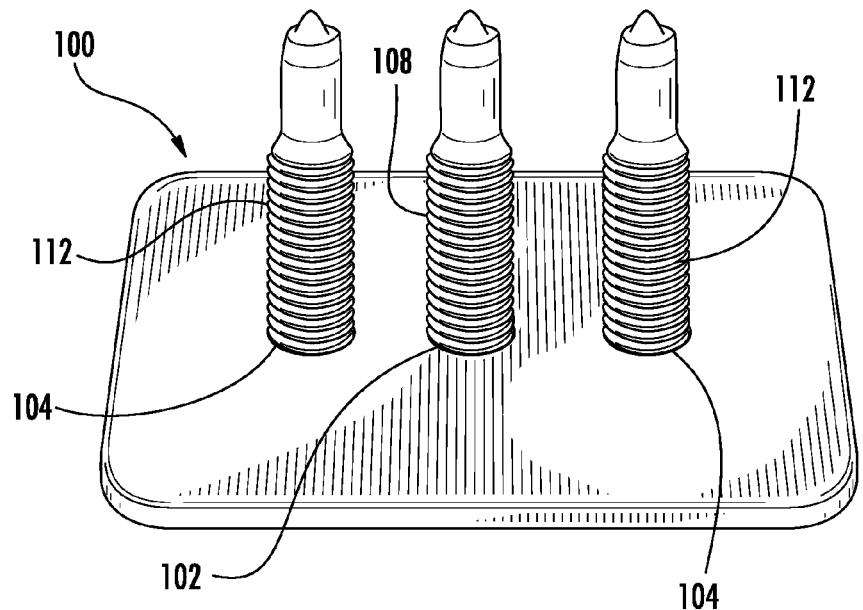
FIG. 4 is a top perspective view of the stud plate of FIG. 2 with additional studs inserted in side openings adjacent the center opening.
Figure 5:
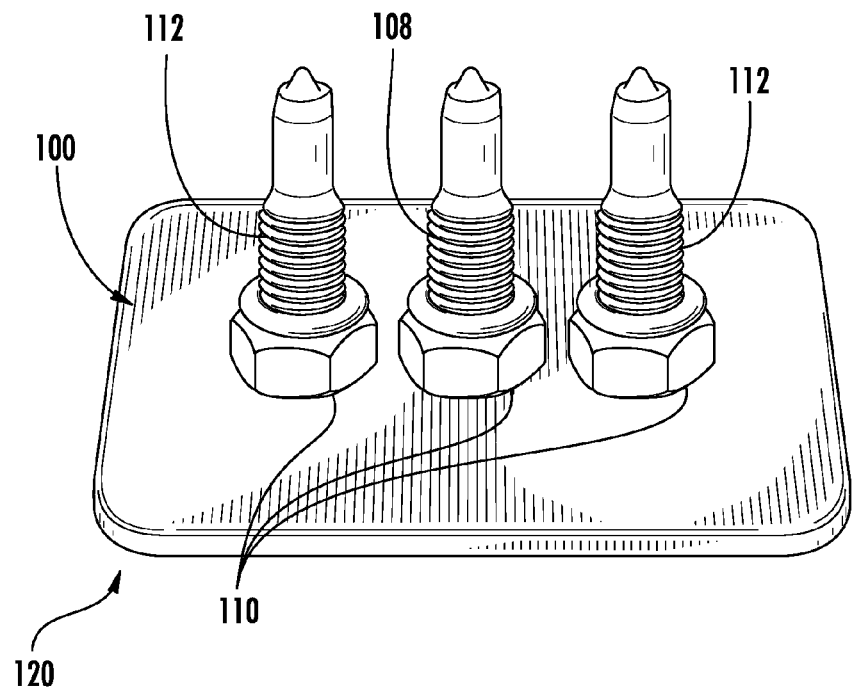
FIG. 5 is a top perspective view of the stud plate of FIG. 4 with fasteners positioned about each stud, forming a traction enhancement device according to the present disclosure.

Stud plate 100 is similar to an existing product known as the Double Digger™ but this existing product only includes side stud openings 104. The Double Digger requires that two openings be made in a track to mount two studs through a single plate to the track. In contract, stud plate 100 provides for a single central mounting stud 108 and at two additional studs to be mounted to the track with only a single hole being required in the track. FIG. 4 shows side studs 112 positioned within openings 104 while FIG. 5 illustrates fasteners 110 positioned about each stud to fully assemble a traction enhancement device 120 according to the present disclosure.

Traction device 120 includes the two side studs 112 which do not extend through the track but which are anchored to base plate 106 and the central mounting stud 108 which extends through the track and serves to both secure device 120 to the track and provide an additional traction stud. The height of the studs may be preferably equal or side studs 112 may be at a different extension above the base than central stud 108.

Figure 6:
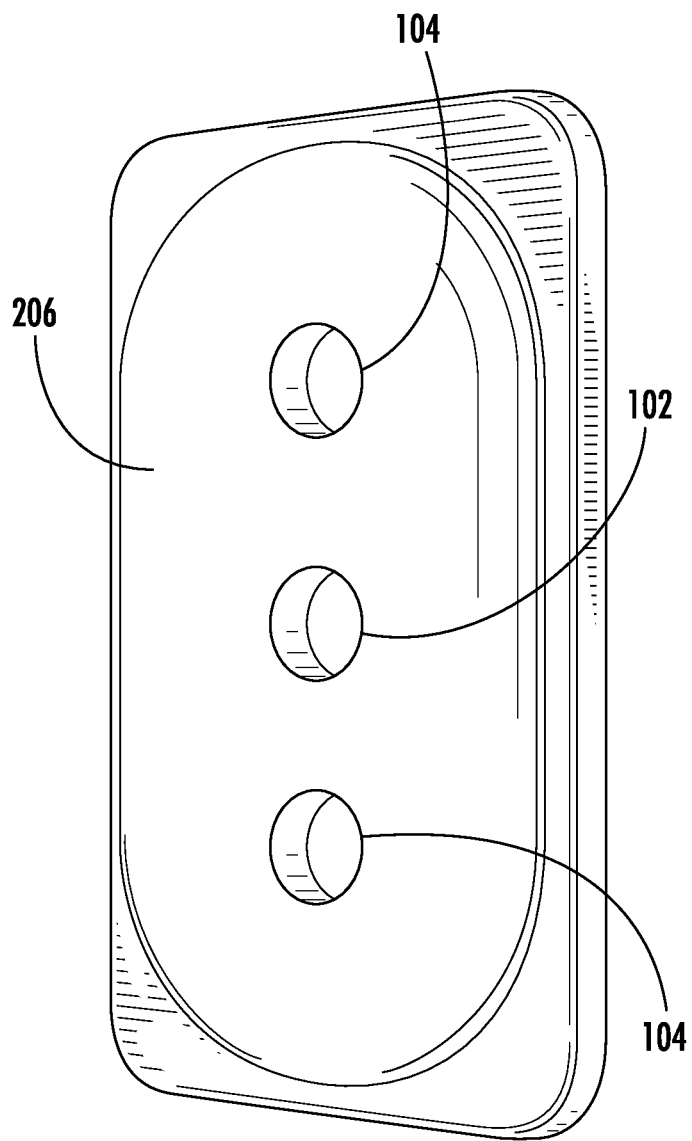
FIG. 6 is an image of the stud plate of FIG. 1.

FIG. 6 illustrates a conventional Double Digger base 206 that has been modified according to the present disclosure with a central mounting opening 102 and a pair of side stud openings 104.

Figure 7:
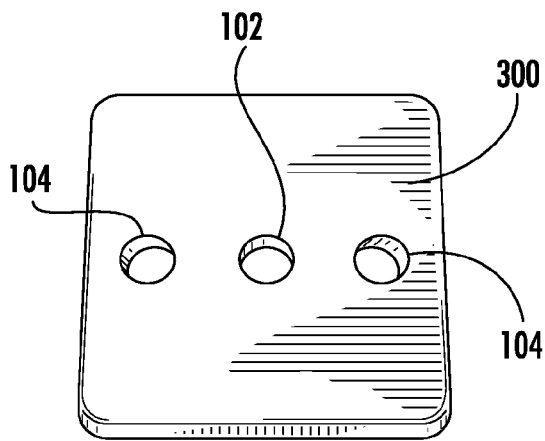
FIG. 7 is a top perspective view of a conventional stud plate modified according to the present disclosure.

FIG. 7 illustrates a stud plate 300 according to the present disclosure with a central stud opening 102 and a pair of side stud openings 104. Stud plate 300 is similar to existing generally square stud plates for mounting a single stud to a snowmobile track but has also includes the side stud openings to permit the inclusion of more than one stud to a track through a single opening in the track, as described above.

Figure 8:
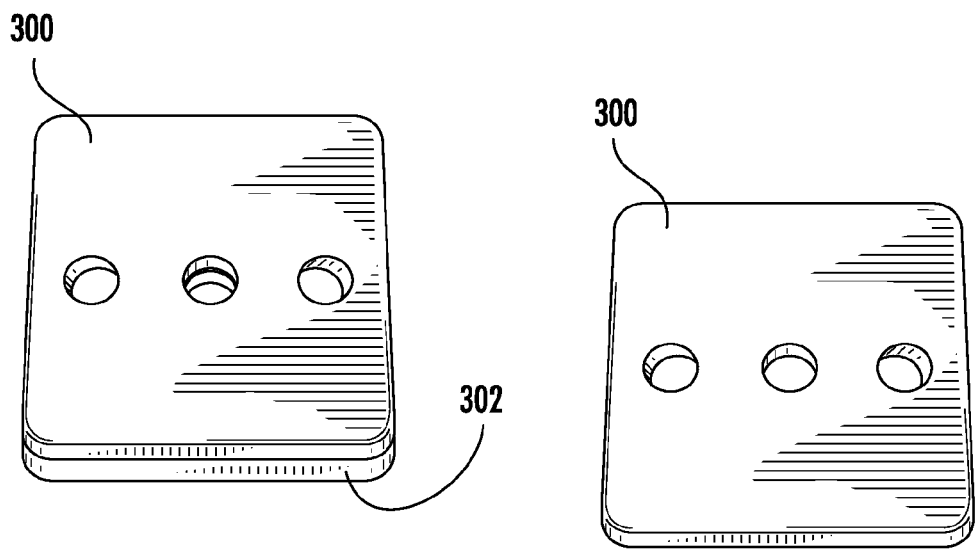
FIG. 8 is a top perspective view of the stud plate of FIG. 7 positioned on top of another stud plate.
Figure 9:
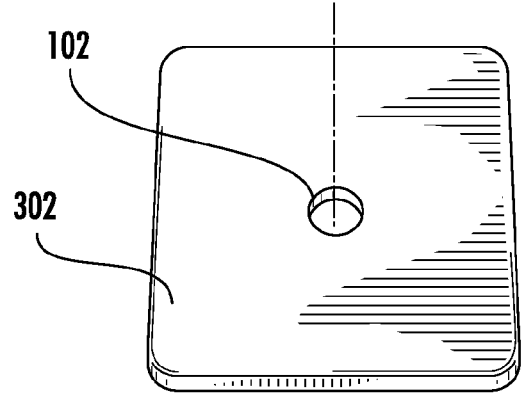
FIG. 9 is an exploded view of the stud plates of FIG. 8.

FIGS. 8 and 9 illustrate stud plate 300 with a second backing plate 302. Backing plate 302 is shown with a single opening 102 for passing a central mounting stud 108 through the plate. It is also anticipated that backing plate 302 may be configured the same as stud plate 300 with a pair side openings 104 along with central opening 102. Backing plate 302 may be positioned directly behind stud plate 302 to provide a solid backing plate for studs extending through side opening 104 or alternatively may be mounted on an inner surface of the track opposite stud plate 300 to provide support to both sides of the track across a wider base to spread the load of the studs to the track more evenly.

Figure 10:
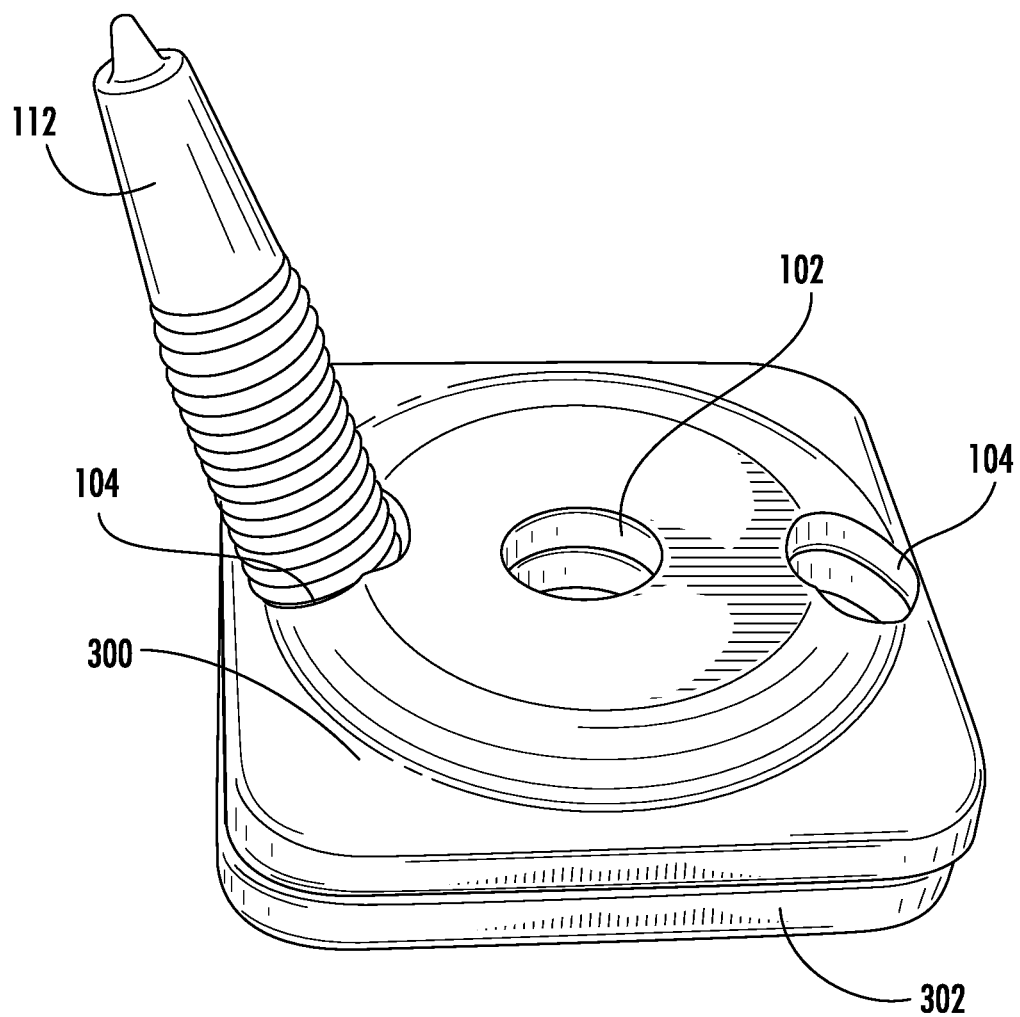
FIG. 10 is an image of the stud plates of FIG. 8 with a stud positioned in a side opening.
Figure 11:
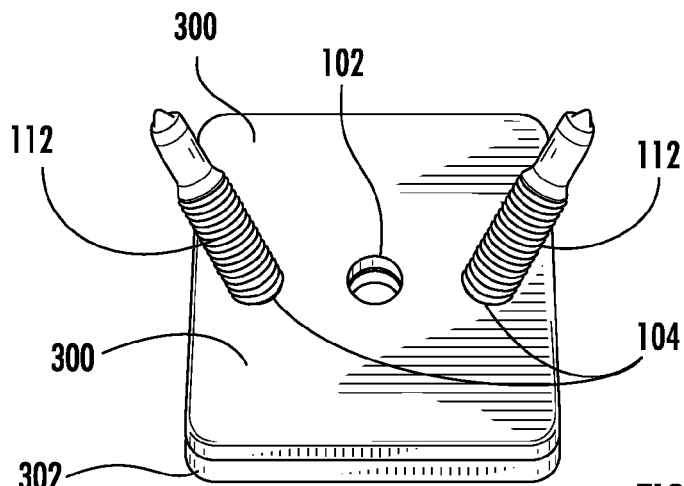
FIG. 11 is a top perspective view of the stud plates of FIG. 8 with two studs positioned in side openings.
Figure 12:
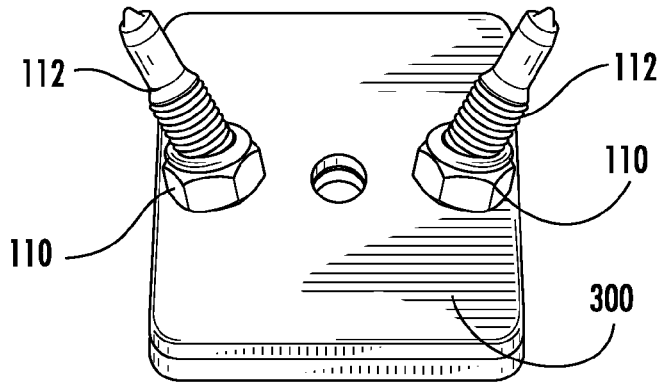
FIG. 12 is a top perspective view of the stud plate of FIG. 11, with fasteners positioned about each stud.
Figure 13:
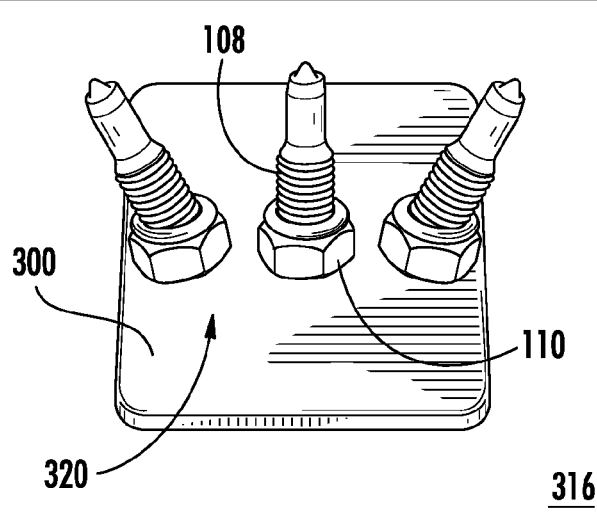
FIG. 13 is a top perspective view of the stud plates of FIG. 12, mounted to a snowmobile track.

FIG. 10 illustrates stud plate 300 and backing plate 302 with a side stud 112 inserted within one of the openings 104. FIG. 11 shows stud plate 300 and backing plate 302 with a pair of side studs 112 inserted within openings 104. FIG. 12 shows the assembly of FIG. 11 with fasteners such as but not limited to nuts 110 positioned about studs 112 to secure them to the stud plate. FIG. 13 illustrates the assembly of FIG. 12 mounted to a snowmobile track 316 and secured to the track by a central mounting stud 108 extending through opening 102 with a fastener 110 securing central stud to the stud plate and the stud plate to the track, comprising a traction enhancement device 320 for track 316.

Figure 14:
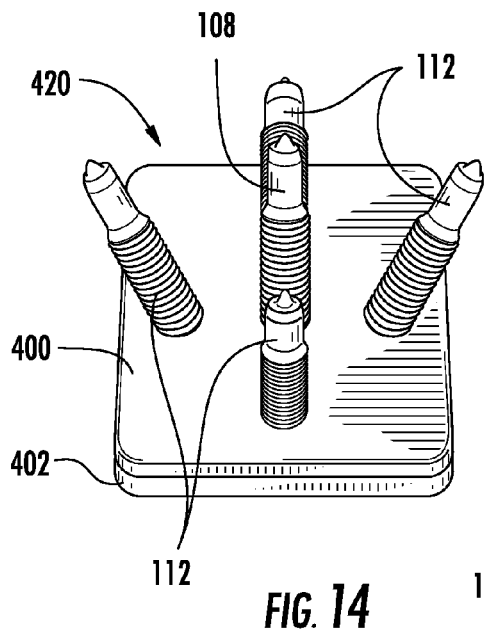
FIG. 14 is a perspective view of a traction enhancement device according to the present disclosure with four side studs extending from the stud plate about the central mounting stud.
Figure 15:
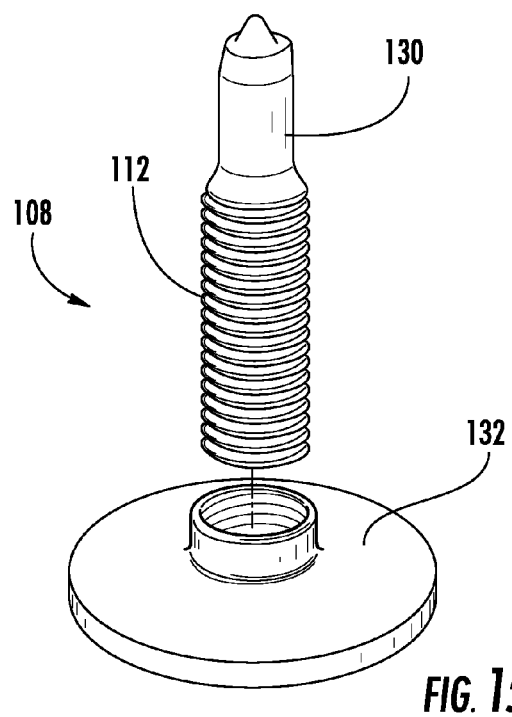
FIG. 15 is a side perspective view of a conventional snowmobile traction stud with the mounting base removed for use with traction devices according to the present disclosure.

FIG. 14 illustrates a further embodiment of a traction enhancement device 420 for mounting to a snowmobile track. Device 420 includes a stud plate 400 with a backing plate 402 and has a central mounting stud 108 extending through a centrally positioned opening. Mounted to and extending through stud plate 400 are four side studs 112. Device 420 is similar in configuration to the device FIG. 15 illustrates stud 108 that includes an upper shaft portion 130 and a lower flange portion 132. As noted above, stud 108 may serves as the central mounting stud for attaching a fraction enhancement device according to the present disclosure to a snowmobile track. Stud 108 may be adapted for use as a side stud 112 by removing essentially all of flanged portion 132. This would serve to shorten the stud to permit side studs 112 to be essentially the same height above the track as central stud 108 even though central stud 108 would pass through the depth of the track and side studs 112 would not. If shaft portion 130 is treaded, it permits the same fasteners 110 to be used to secure side studs 112 to a stud plate as well as securing central stud 108 to the plate and securing the device to the track. Such a simplified parts list may make manufacturing of a traction device according to the present disclosure more cost effective.

Figure 16:
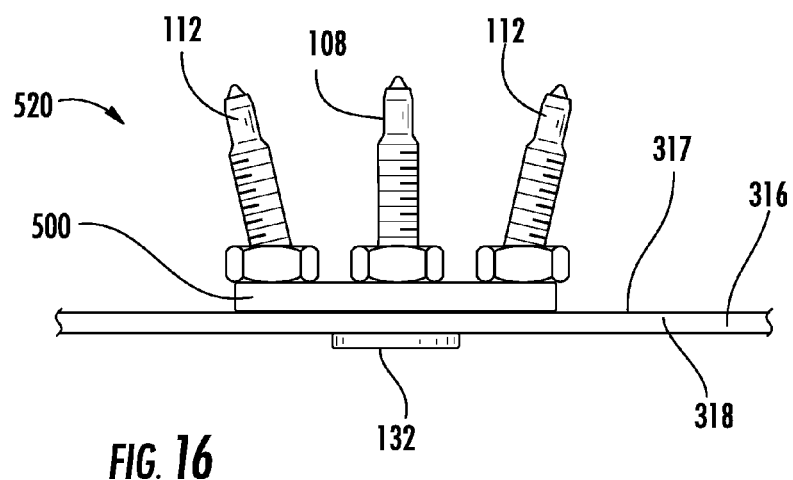
FIG. 16 is a side view of the traction enhancement device according to the present disclosure.

FIG. 16 illustrates a traction enhancement device 520 according to the present disclosure that includes a stud plate 500, side studs 112 and a central mounting stud 108. Mounting stud 108 includes lower flange portion 132. To mount device 520 to a snowmobile track, central stud 108 would be removed from central opening 102. Stud 108 would then be extended through the track from the inside out so that shaft portion 130 extends beyond the outer surface of the track within flange portion 132 resting against an inner surface 318 of track 316. Stud plate 500 with side studs 112 mounted to the stud plate would then be placed on an outer surface 317 of track 316 with shaft portion 132 extending through central opening 102. Fastener 110 would then be placed about shaft portion 130 and turned to draw device 520 tight against outer surface 317 of the track and secure the device to the track for use.

As shown in FIG. 16, the side studs may be angled outward with respect to the central mounting stud to provide a wider base for traction while maintaining a relatively smaller stud plate. Alternatively, as shown in FIGS. 1 to 6, the stud plate may be wider so that the side openings and the central opening are further spaced apart and the studs can extend from the plate generally parallel to each other.

Side studs 112 may be mounted to stud plate in any number of appropriate fashions. Side studs may be tapered so that fasteners 110 draw them tightly into appropriately sized side openings 104. Side studs may be welded, glued or otherwise chemically or physically bonded into openings 104. Side studs 112 may be formed integrally with the stud plate.

It is not intended to limit in any way the nature of the materials that the various components described herein may be made from. While steel or other metals are commonly used for traction devices for snowmobiles, it is anticipated that other materials may also have properties suitable for use as described herein. The method of manufacture of the devices is also not intended to be limited by this disclosure.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

What is claimed is:

1. A traction enhancement device for a snowmobile, the device comprising:
   a stud plate with a central opening and a plurality of side openings;
   a central mounting stud extending through the central opening in the stud plate, the central mounting stud including a shaft portion extending through the stud plate and a flange portion on an opposite side of the stud plate;
   a plurality of side studs, each stud positioned in one of the plurality of side openings and extending from the stud plate, the side studs being separate from and not integrally formed with the stud plate, and the side studs and the central mounting stud being generally linearly arranged;
   wherein the stud plate is configured to mount to a single opening in a snowmobile track with the central mounting stud extending through the track and the side studs not extending through the track and wherein the side studs and the central mounting stud extend generally the same height above the stud plate when the stud plate is mounted to the snowmobile track.

2. The traction enhancement device of claim 1, further comprising two side studs, with each side stud extending through one of the side openings of the stud plate.

3. The traction enhancement device of claim 1, further comprising four side studs, with each side stud extending through one of the side openings of the stud plate.

4. The traction enhancement device of claim 1, further comprising a backing plate between the flange portion of the central mounting stud and the stud plate.

5. The traction enhancement device of claim 1, wherein the central mounting stud and the side studs extend from the stud plate generally parallel to each other.

6. The traction enhancement device of claim 1, wherein the side studs are angle outward with respect to the central mounting stud.

7. A method of mounting a traction enhancement device to a snowmobile track, the method comprising:
   providing a traction enhancement device with a stud plate having a central mounting opening and a plurality of side openings and a plurality of side studs, with each side stud extending through one of the plurality of side openings of the stud plate, the side studs being separate from and not integrally formed with the stud plate, and the side studs and the central mounting stud being generally linearly arranged;

providing a stud opening in the snowmobile track extending from an inner surface to an outer surface;

providing a central mounting stud having a shaft portion and a flanged portion;

placing the central mounting stud through the stud opening in the snowmobile track with the shaft portion extending through the snowmobile track and beyond the outer surface of the snowmobile track and the flanged portion adjacent the inner surface of the snowmobile track;

placing the stud plate on the outer surface of the snowmobile track with the shaft portion of the central mounting stud extending through the central opening of the stud plate;

placing a fastener about the central mounting stud and securing the traction enhancement device to the snowmobile track with the side studs and central mounting stud extending generally the same height above the mounting plate and the side studs not extending through the snowmobile track.

\* \* \* \* \*